Figure 1:
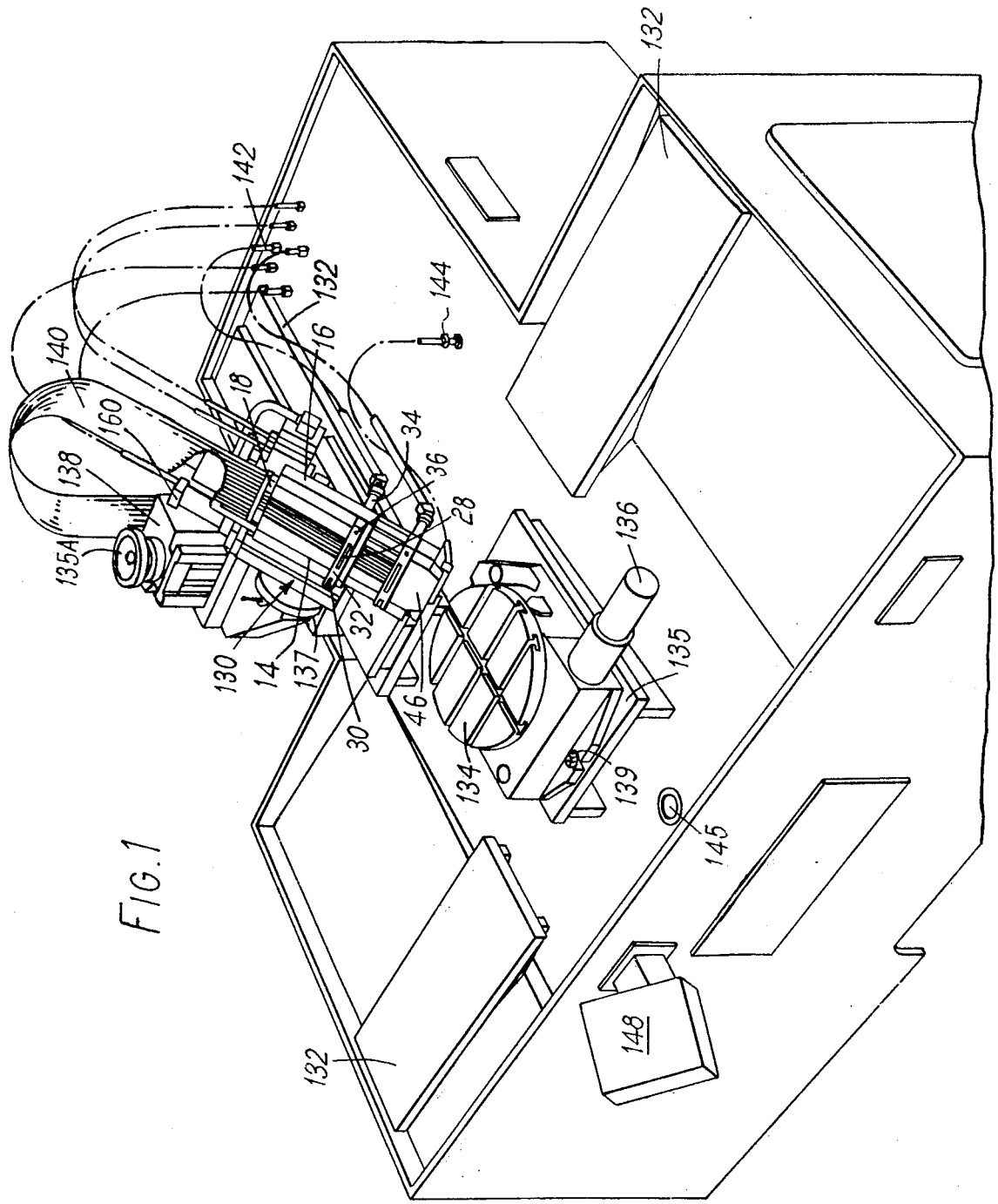

United States Patent [19]

Baker

[11] 4,121,081

[45] Oct. 17, 1978

[54] APPARATUS FOR AND METHOD OF REFEEDING ELECTRODES IN AN ELECTRICAL DISCHARGE MACHINING APPARATUS

[75] Inventor: George Edward Baker, Asfordby, near Melton Mowbray, England

[73] Assignee: Amchem Company Limited, Silbey, England

[21] Appl. No.: 731,571

[22] Filed: Oct. 12, 1976

[30] Foreign Application Priority Data

Oct. 15, 1975 [GB] United Kingdom .............. 42164/75

[51] Int. Cl.² ............................................... B23P 1/08
[52] U.S. Cl. .................................. 219/69 E; 219/69 M
[58] Field of Search ................ 219/69 E, 69 M, 69 V, 219/69 R, 69 G, 69 W, 131 F; 204/224 M, 129.55; 279/102

[56] References Cited

U.S. PATENT DOCUMENTS

| | | | |
|---|---|---|---|
| 3,855,442 | 12/1974 | Check et al. | 219/69 E |
| 3,981,786 | 9/1976 | Andrews | 219/69 E |
| 3,995,134 | 11/1976 | Dudden | 219/69 E |

*Primary Examiner*—Bruce A. Reynolds
*Attorney, Agent, or Firm*—Charles E. Brown

[57] ABSTRACT

This disclosure relates to the refeeding of one or more electrodes of an electrical discharge machining apparatus after the electrodes have been used and unevenly worn. The electrodes are mounted within a cartridge which includes an element which offers frictional resistance to the movement of the electrodes relative to the cartridge so that when the cartridge is advanced to engage the electrodes with a workpiece the electrodes are automatically recessed within the cartridge until the tips of all electrodes are aligned. A clamp is provided for then securely clamping the electrodes against further movement relative to the cartridge.

15 Claims, 4 Drawing Figures

APPARATUS FOR AND METHOD OF REFEEDING ELECTRODES IN AN ELECTRICAL DISCHARGE MACHINING APPARATUS

The present invention relates to electrical discharge machining apparatus and in particular to such an apparatus for simultaneously machining a plurality of small holes, typically a few thousandths of an inch in diameter. The invention is concerned also with a method of refeeding one or more electrodes in an electrical discharge machining apparatus.

Electrical discharge machining depends upon the very high temperature of a spark to melt material, such as metal, from the surface of a workpiece. The sparks are produced at a high rate (typically 15,000 to 30,000 per second) by either a resistance-capacitance electrical system or a rotary impulse generator.

It is known to produce a plurality of coincident sparks from mutually insulated electrodes to enable a common workpiece to be machined by all the electrodes.

A typical multi-feed electrical discharge machining apparatus includes a plurality of electrodes mounted in a cartridge for guided movement relative to a machine bed upon which a workpiece, or a succession of workpieces are carried. Erosion of the electrode tips occurs during machining and the eroded length of electrode must be replaced if satisfactory machining is to be achieved in a subsequent machining operation. Erosion is a particular problem in the case of small, wire-like electrodes having a diameter of a few thousandths of an inch.

Hitherto one method used to replace eroded electrode, or refeeding the electrode as it is known in the art, consists of an operator manually releasing the electrodes in the cartridge, sliding the electrodes towards the workpiece and reclamping the electrodes at the cartridge. Clearly this method is time-consuming and thus expensive.

In another known method of refeeding, wheels are provided for positively driving the electrodes forward relative to the cartridge towards a workpiece at the end of a machining operation. One disadvantage to the use of wheels is that, in practice, it is difficult to set the pressures of the wheels on the electrodes sufficiently highly as to drive the electrodes forward, whilst at the same time allowing slipping contact once the surface of the workpiece is reached. A further disadvantage of this method of refeeding is that refeeding is comparatively slow, since the speed of refeeding is controlled by the speed of rotation of the wheels.

In accordance with one aspect of the present invention there is provided a method of refeeding one or more electrodes in an electrical discharge machining apparatus which comprises locating the or each electrode in a cartridge spaced from a nose guide of the apparatus, releasably clamping the or each electrode in said cartridge with part of the length thereof supported in the nose guide and extending towards a workpiece to be machined, releasing said clamp and advancing said cartridge towards said nose guide whilst retaining frictional contact upon said electrodes in such a manner as to allow the or each electrode to be slidably received back in said cartridge upon the tips of the electrodes striking the workpiece and reclamping said clamp.

In accordance with another aspect of the present invention there is provided an electrical discharge machining apparatus for machining a workpiece comprising an electrode cartridge arranged to contain at least one electrode, the cartridge being mounted for rectilinear movement with respect to a nose guide of the apparatus with part of the length of the or each electrode supported in the nose guide, a clamp releasably clamping the or each electrode in the cartridge and means offering frictional resistance to the passage of the electrode or electrodes through the cartridge when the clamp is released, means being provided for advancing the cartridge and the electrode or electrodes towards the nose guide, the electrode or electrodes being received back into the cartridge upon striking the workpiece.

Applicant is also the inventor in application Ser. No. 666,916 filed Mar. 15, 1976 and entitled Electrical Discharge Machining Apparatus, now U.S. Pat. No. 4,041,269 granted Aug. 9, 1977.

Figure 2:
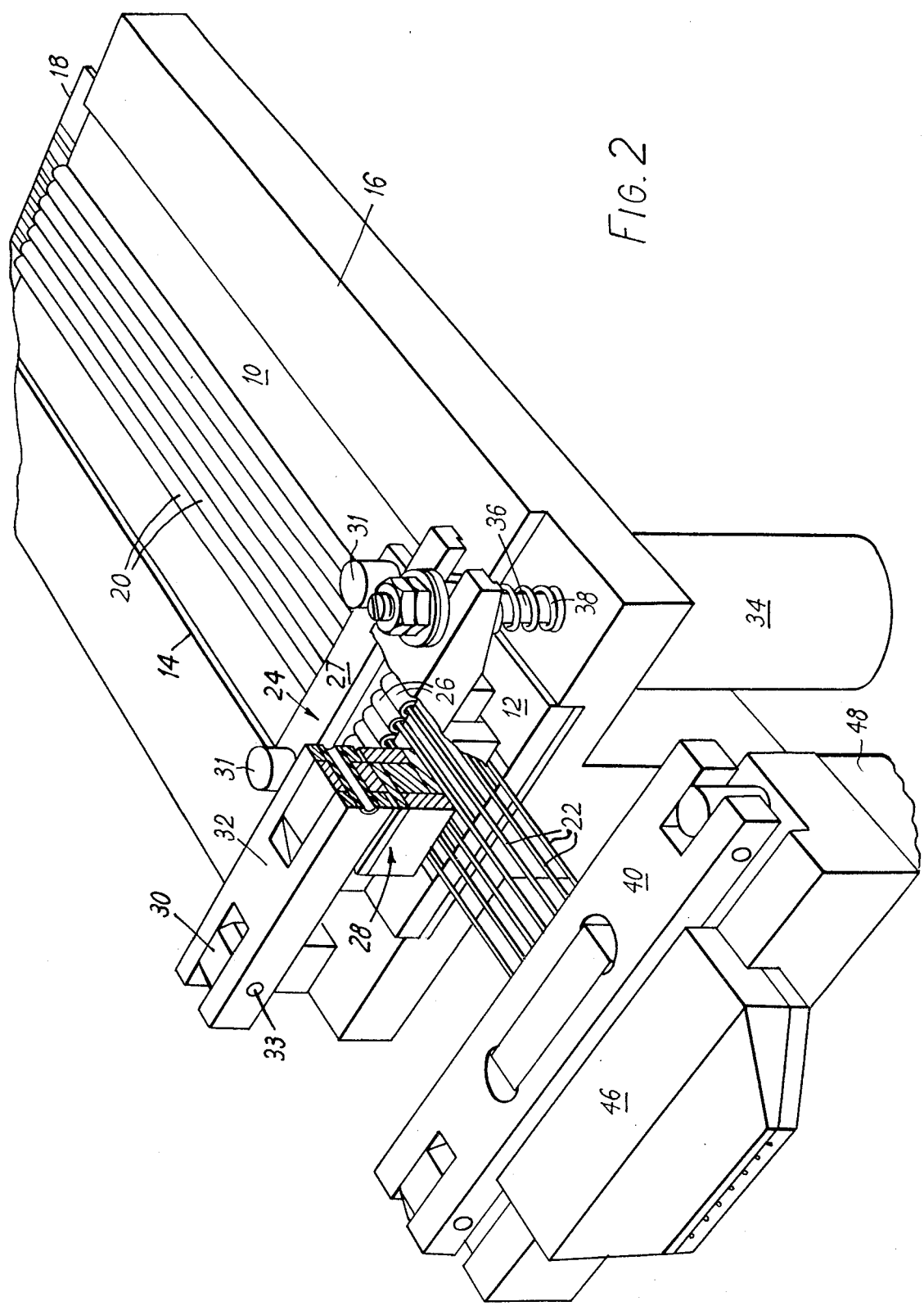
Figure 3:
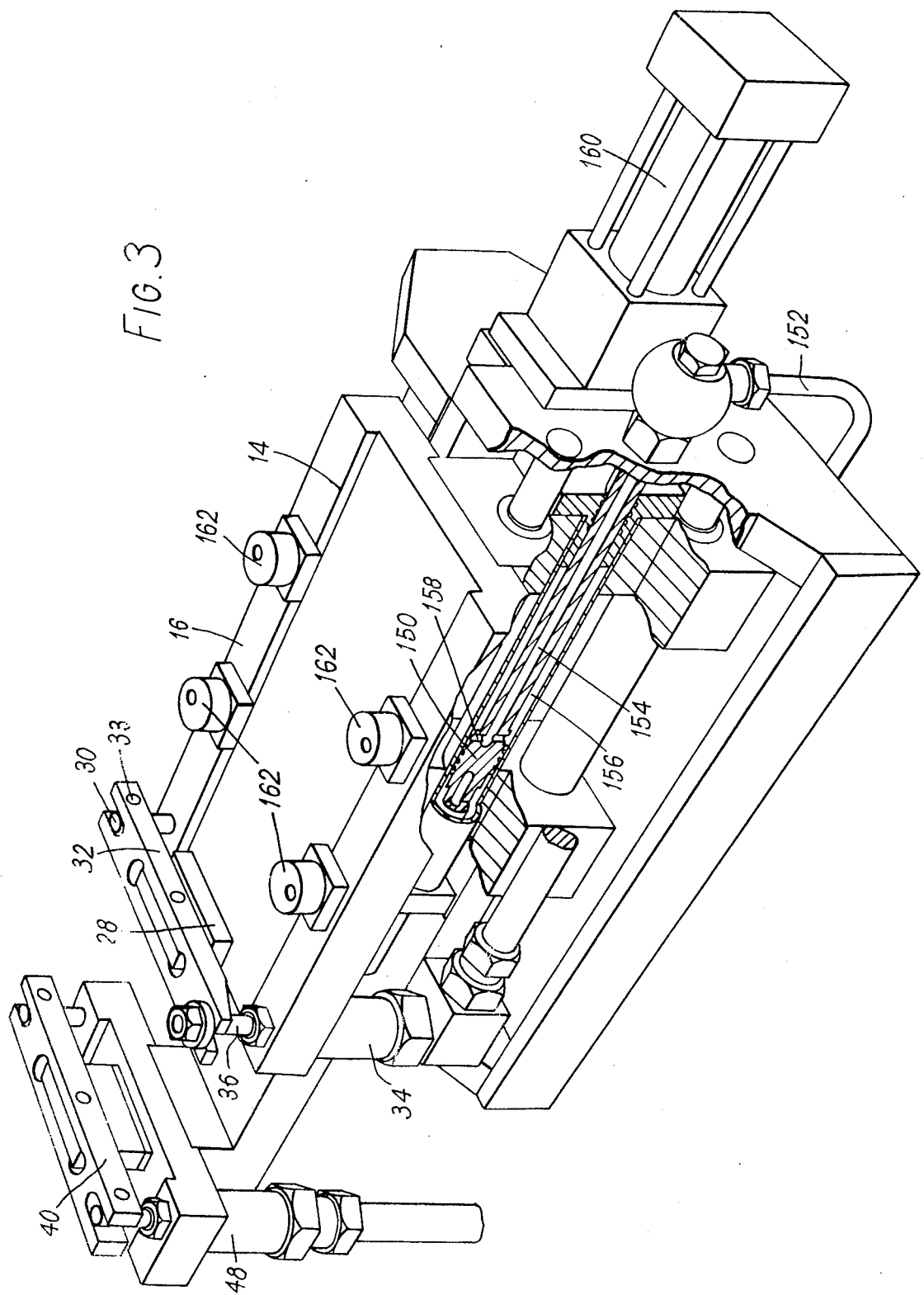
Figure 4:
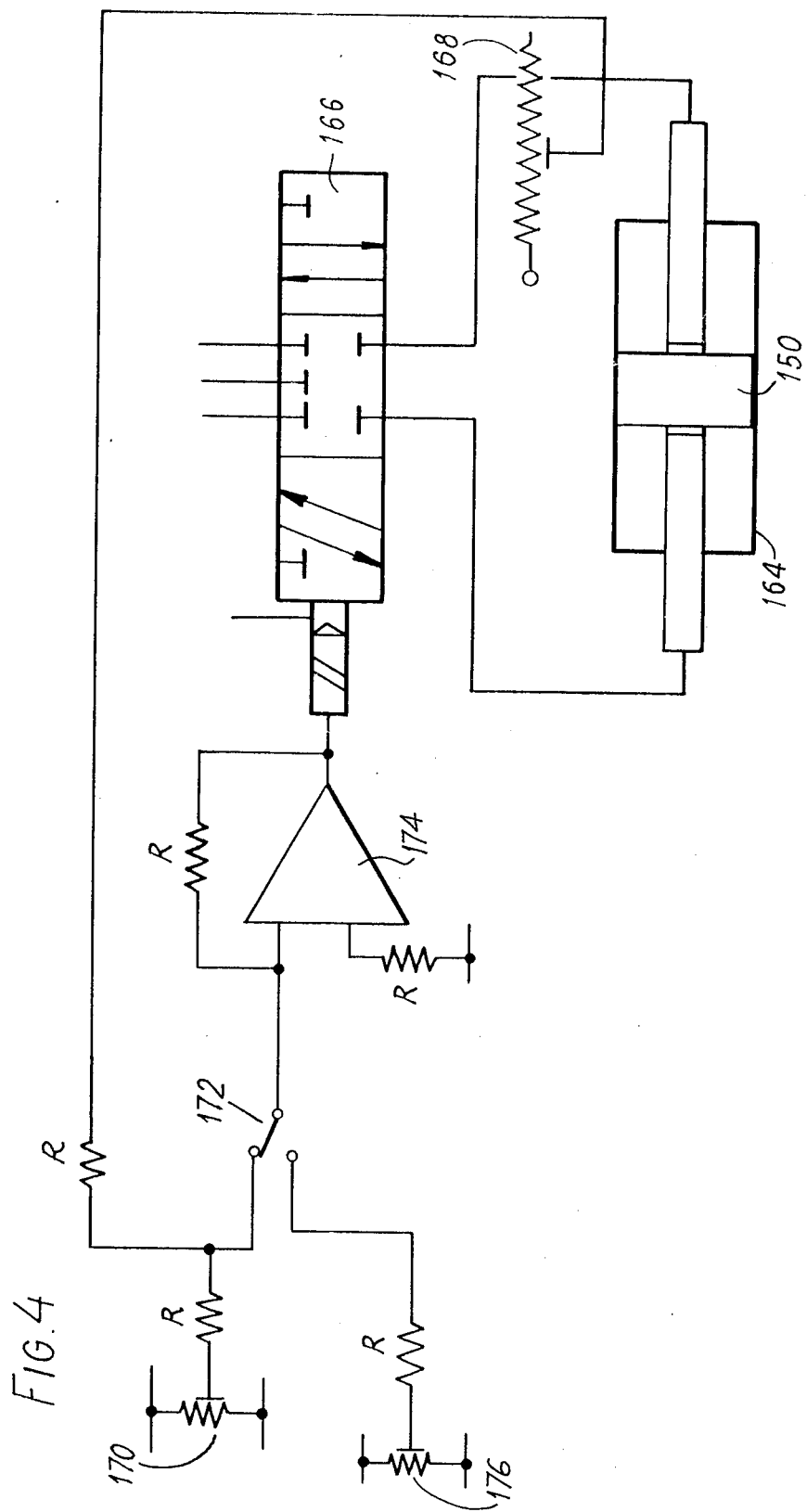

The invention will now be described further by way of example with reference to the drawings in which:

FIG. 1 is a general perspective view of an electrical discharge machining apparatus embodying the present invention, FIG. 2 is an enlarged perspective view of part of the apparatus shown in FIG. 1, including the cartridge, FIG. 3 is a perspective view, partly in section, of a mechanism for causing the cartridge to slide relative to the machine bed and the nose guide of the electrical discharge machining apparatus, and FIG. 4 illustrates diagrammatically part of a control system for controlling the sequence of operation of the apparatus illustrated in FIGS. 1 to 3.

The electrical discharge machining apparatus illustrated in FIG. 1 has a single head shown generally as 130 mounted on a flat 132, two other flats 132 being provided on the machine top or bed to enable the apparatus to carry up to three heads. 134 is a rotary indexing plate assembly to which a workpiece is clamped, the plate 134 being indexable as required by a stepper motor 136 in known manner. The indexing plate assembly is firmly secured to a plinth 135 by bolts 139.

A cartridge, to be described with respect to FIG. 2, is mounted on a column 138. The cartridge is rectilinearly adjustable in a manner to be described and may also be vertically and rotatably adjusted by a threaded spindle assembly 135A and a dial 137 respectively. 140 is a tape carrying electrical conductor which connects with and affords an electrical supply to a printed circuit board 18 of the cartridge. 142 are hydraulic pipes for the hydraulic circuitry to the cartridge slide (to be described later) and 144 is a flexible tube which carries dielectric fluid for electrical discharge machining from a dielectric tank within the machine (not shown) to an electrode nose guide 46. Dielectric fluid is injected into the nose guide and caused to trickle down each of the machining electrodes. 145 is an aperture in the bed of the apparatus and leads to a dielectric tank, thus allowing dielectric fluid to be returned to the tank and thence recirculated. 148 is a machine control console.

The cartridge, which may be best seen from FIG. 2, consists of an aluminium slide 16 which is mounted for reciprocal movement with respect to the nose guide 46 of the electrical discharge machining apparatus. The slide 16 includes a longitudinally extending groove 14.

Two perspex plates 10 and 12, the top surfaces of which are slightly stepped, are removably received in the groove 14. A plurality of parallel glass tubes are bonded to the plate 10 in two tube sections. The first section, at a position remote from the nose guide 46, includes a plurality of roughly machined tubes 20, the second section being spaced from the first section and including a plurality of accurately machined glass tubes 26.

Means offering frictional resistance to the passage of electrodes through the tubes is arranged between the two tube sections. In the illustrated cartridge, the means comprises a friction pad device shown generally as 24. The pad includes a pair of spaced studs between which a clamp plate 27 is adjustably supported by means of knurled nuts 31. The facing surfaces of the clamp plate 27 and that of the plate 10 opposite thereto are surfaced with a frictional material. It may thus be seen that when electrodes 22 pass between the two layers of frictional material, the frictional pressure exerted on the electrodes may be adjusted as required by turning the knurled nuts 31.

The printed circuit board 18 is mounted in the groove 14, the board conductors lying below the plate 10, but passing between the plates 10 and 12 so that they lie in parallely spaced relationship on the plate 12. The spacing of the conductors is such that an electrode 22 emerging from the glass tubes passes over a respective conductor and makes electrical contact therewith. Thus the plate 12 is stepped up relative to the plate 10 by an amount corresponding to the wall thickness of the tubes 26.

The cartridge is positioned in the electrical discharge machining apparatus of FIG. 1 so that the electrodes emerging from the glass tubes pass through the nose guide 46 of the electrical discharge machining apparatus. It will be appreciated that there is no physical connection between the cartridge and the nose guide other than by way of the electrodes themselves and that, accordingly, the nose guide does not form part of the present invention.

A clamp pad shown generally as 28 in FIG. 2 is mounted on the slide 16 and includes a post 30 which pivotally mounts an arm 32 at a pivot 33. The free end of the arm 32 is birfucated and receives the platen rod 36 of a single-acting hydraulic cylinder 34. A helical spring 38 mounted around the rod 36 is arranged to normally clamp the electrodes, but the clamping pressure may be released by actuation of the hydraulic cylinder 34 when it is desired to feed the electrodes through the cartridge.

A further clamp 40 is mounted adjacent the nose 46 and is normally in a released condition. The clamp 40 may be actuated, however, to clamp the electrodes by actuation of an hydraulic cylinder 48 as will be described later.

As may be seen from FIG. 3, the cartridge including its slide 16 forms part of the cylinder of a double-acting piston and cylinder assembly, the piston 150 of which is fixed so that the cartridge and slide can move rectilinearly thereto.

Hydraulic fluid is supplied to the piston and cylinder assembly through a pair of opposed conduits, one of which 152 may be seen in FIG. 3. The fluid is led along a passage 154 towards the piston 150 but is then directed into an expansible chamber 156 via radially-directed ports 158. It will be appreciated that the above comments apply to both sides of the piston 150 so that, as the chamber 156 to the right of the piston 150 is expanded, the volume to the left of the piston is decreased and the slide 16 thus moved to the right, as viewed, and is therefore retracted. Conversely, when fluid is supplied to the chamber 156 to the left of the piston, the right hand chamber is decreased in volume thus causing the slide 16 to move to the left, as viewed, and to advance towards a workpiece. It is this piston and cylinder assembly which is used for refeeding the electrodes, as will be described later.

In addition to the above hydraulic circuitry an additional hydraulic cylinder 160 is provided and this is used as a rapid advance cylinder for initially bringing the electrodes into contact with the workpiece.

FIG. 3 also shows four eccentrically-mounted knurled studs 162 which are used for mounting a cartridge in a quick release fashion to the slide 16. The studs 163 were omitted from FIG. 1 of the drawings for the sake of clarity and in FIG. 3 they are shown in a cartridge locking position although a cartridge itself is not illustrated.

When a workpiece is to be machined the rapid advance cylinder 160 brings the electrodes into a machining position and thereafter is not used. Machining is then effected but after each machining operation the cartridge is indexed forward by the piston and cylinder assembly towards a workpiece clamped to the plate and the nose guide 46 so that the distance between the nose guide and the cartridge decreases progressively as machining continues.

In the control system illustrated in FIG. 4, the piston of the piston and cylinder assembly is shown diagrammatically at 150 and the cylinder which carries the electrode cartridge at 164. The position of the cylinder 164 relative to the piston is hydraulically controlled by a servo-valve 166. The switching of the servo-valve itself is electrically controlled by a position transducer 168 connected to the cylinder 164. The position transducer provides a first voltage proportional to the position of the cylinder (and therefore of the cartridge) and this first voltage is added to a variable reference second voltage of opposite polarity derived from a reference source, a motorised potentiometer 170. Conveniently the motorised potentiometer is mounted in a control cabinet remote from the apparatus proper.

REFEED OPERATION

At the moment an operator initiates the refeed operation the clamp pad 28 is released and the electrodes are held in the cartridge solely by the friction between their surfaces and the cartridge.

The operator starts the refeed operation by setting a timer (not shown) to feed the second voltage from the motorised potentiometer 170 for a fixed time period, this second voltage increasing at a fixed rate. The timer is set with a time period chosen to give sufficient time for a length of electrode corresponding to a length of electrode worn away in the most worn electrode to be received back into the cartridge so that after refeeding the electrodes will all be of the desired length.

The second voltage is added to the first voltage derived from a positional transducer 168. The resultant of these two voltages is fed through switch 172 to an input of an amplifier 174. An output of the amplifier 174 is fed to a servo valve 166 which lowers the cylinder 164 relative to the piston 150, thereby also lowering the cartridge. Since the positional transducer 168 is physically linked to the cylinder 164, movement of the cylinder causes corresponding changes in the first voltage derived from the positional transducer. The cylinder therefore moves steadily downward as the second voltage increases unless at any given instant the first and second voltages are substantially equal and opposite, in which case the movement of the cylinder 164 would at least momentarily stop.

During the downward movement of the cylinder 164 the electrodes abut the workpiece and the least worn ones are received back into the cartridge until the electrodes are all of the correct length relative to one another.

When the fixed time period set up on the timer has elapsed the following operations are made:

1. Movement of the motorised potentiometer is stopped and this thereafter gives a constant voltage output, permitting matching of the first and second voltages and stoppage of cylinder 164.
2. The clamp pad 28 is secured to clamp the electrodes in the cartridge.
3. The switch 172 is changed over so that amplifier 174 is fed from an electrode voltage source 176, and the cylinder 164 moves down toward the workpiece.
4. Electrode voltage is fed to the electrodes and machining commences.

In operation the electrodes are manually inserted into the glass tubes and caused to pass through the various clamps and into the nose guide 46. The ends of the electrodes are advanced to a position in contact with a workpiece surface by means of the rapid advance cylinder 160, the clamp 28 then being operated so as to clamp the electrodes in that position. In practice there is a sufficient gap between the tips of the electrodes in that position. In practice there is a sufficient gap between the tips of the electrodes and the workpiece as to allow machining, so that machining is effected in known manner with a dielectric fluid, such as ionized water or paraffin, being caused to pass through the nose 46 through apertures (not shown) and drip down the electrodes onto the workpiece being machined. Should the electrodes short onto the workpiece, however, the carriage is caused to move backwards by a small distance, typically 0.010 inches, to create a gap between the electrodes and the workpiece in which a spark may be formed.

During machining, particularly in the case where electrodes of only a few thousandths of an inch diameter are used, the electrodes wear unevenly so that it is necessary to realign the tips of the electrodes if machining is not to be impaired. After machining has been completed, therefore, the clamp 28 is released and the carriage indexed forward so as to close the gap between the cartridge and the nose guide 46. At the same time, because of the frictional resistance created by the friction pad device 24, the electrodes 22 are forced forward and on to the surface of a new workpiece to be machined. Once the electrodes have touched that surface, however, continued forward movement of the carriage overcomes the frictional resistance of the friction pad device 24 so that the electrodes 22 remain stationary until the carriage completes its forward movement, any forward movement of the carriage once the electrodes have touched the workpiece being accommodated by the electrodes being received back into the tubes.

The clamp 28 is then re-applied by the control system so that the electrodes are again held in fixed relationship within the cartridge. Thereafter, if necessary, the control system causes the carriage to move back a small distance as previously described to allow sparks to be created between the tips of the electrodes and the workpiece.

One advantage which the invention offers is that none of the electrode lengths are wasted. After a number of refeeding operations, however, the gap between the nose guide 46 and the cartridge is insufficient to permit a further refeed operation. In these circumstances the control system operates the clamp 40 by means of the hydraulic cylinder 48, the clamp 28 is released and the carriage moved backwards so that the gap between the nose guide 46 and the carriage is increased to a fixed distance determined by a limited stop so that further lengths of electrodes are exposed. The clamp 40 is then released and the clamp 28 reapplied so that the apparatus is free for further machining.

Whilst the tubes bonded to the plate 10 have been described as made from glass, metal tubes may be used in which they may also provide electrical connection to the relevant electrode.

What we claim is:

1. A method of refeeding at least one electrode in an electrode discharge machining apparatus, said method comprising the steps of locating each electrode in a cartridge spaced from a nose guide of the apparatus, releasably clamping each electrode in said cartridge with part of the length thereof supported in the nose guide and extending towards a workpiece to be machined, releasing said clamp and advancing said cartridge towards said nose guide whilst retaining frictional contact upon each electrode in such a manner as to allow each electrode to be slidably received back in said cartridge upon the tip of each electrode striking the workpiece, continuing moving said cartridge towards the workpiece beyond the position where each electrode engages the workpiece, and reclamping said clamp.

2. An electrical discharge machining apparatus for machining a workpiece, said apparatus comprising a nose guide, an electrode cartridge having means for containing at least one electrode, the cartridge being mounted for rectilinear movement with respect to said nose guide of the apparatus with part of the length of each electrode supported in the nose guide, a clamp releasably clamping each electrode in the cartridge and means offering frictional resistance to the passage of each electrode through the cartridge when the clamp is released, and means for advancing the cartridge and each frictionally retained electrode towards the nose guide beyond the portion where each electrode will engage an associated workpiece, each electrode being received back into the cartridge upon striking the workpiece.

3. An apparatus as claimed in claim 2 which includes a column on a machine bed and means mounting the cartridge on said machine bed.

4. An apparatus as claimed in claim 3 in which the cartridge is carried by a slide and is vertically and rotatably adjustably mounted on the column by means of a threaded spindle assembly and a dial respectively.

5. An apparatus as claimed in claim 4 in which the cartridge and slide form the cylinder of a double acting piston and cylinder assembly, the piston of which is fixed so that the cylinder is capable of rectilinear movement relative thereto.

6. An apparatus as claimed in claim 5 in which hydraulic fluid is supplied to the piston and cylinder assembly through a pair of opposed conduits each of which leads into an expansible chamber on either side of the fixed piston via radially-directed ports.

7. An apparatus as claimed in claim 5 in which the cartridge is mounted in a quick-release manner to the slide by means of eccentrically-mounted knurled studs secured to the slide.

8. An apparatus as claimed in claim 2 in which the means offering frictional resistance to the passage of each electrode through the cartridge comprises a friction pad which is mounted in frictional contact with each electrode when received in the cartridge.

9. An apparatus as claimed in claim 8 in which there are means mounting said friction pad for adjustment of frictional pressure exertable on each electrode.

10. An apparatus as claimed in claim 2 in which said apparatus includes a rotary indexing plate assembly including a plate and a stepper motor for indexing said plate, and means on said plate for supporting and clamping a workpiece to be machined.

11. An apparatus as claimed in claim 10 in which the rotary indexing plate assembly is secured firmly to a plinth on the machine bed.

12. An apparatus as claimed in claim 2 in which the clamp which releasably clamps each electrode in the cartridge includes an arm, means pivotally mounting one end of said arm, the other end of said arm being resiliently clamped with said arm being in resilient contact with each electrode, and a hydraulic cylinder connected to said arm for releasing said arm other end when it is desired to feed each electrode through the cartridge.

13. An apparatus as claimed in claim 2 in which a further clamp is provided adjacent said nose guide and on the side thereof adjacent said cartridge, said further clamp normally being in a released condition to allow each electrode to pass therethrough but being actuable to clamp each electrode when it is desired to move the cartridge back and away from the nose guide.

14. An apparatus as claimed in claim 13 in which the further clamp is actuable by means of a hydraulic cylinder.

15. An apparatus as claimed in claim 2 in which a rapid-advance cylinder is provided for initially bringing each electrode in the cartridge into contact with a workpiece.

* * * * *